United States Patent [19]

Horie et al.

[11] Patent Number: 4,741,778

[45] Date of Patent: May 3, 1988

[54] THERMAL CONTROL COATING COMPOSITION

[75] Inventors: Toshio Horie, Iruma; Yoshinori Hasuda, Koganei, both of Japan

[73] Assignee: Nippon Telegraph & Telephone Corporation, Tokyo, Japan

[21] Appl. No.: 25,677

[22] Filed: Mar. 13, 1987

[30] Foreign Application Priority Data

Mar. 22, 1986 [JP] Japan .................................. 61-64495
Jun. 13, 1986 [JP] Japan ................................. 61-136080

[51] Int. Cl.$^4$ .......................... C08L 83/06; C09K 3/00
[52] U.S. Cl. ............................. 106/287.16; 106/287.18
[58] Field of Search ..................... 106/287.14, 287.16, 106/287.18

[56]  References Cited

U.S. PATENT DOCUMENTS 4,571,365  2/1986  Ashlock et al. ................ 106/287.14
4,648,904  3/1987  DePasquale et al. .......... 106/287.14

OTHER PUBLICATIONS

Physics of Thin Films, vol. 5, H. Schroeder; G. Haas & R. E. Thun, Eds. Ch. 3, Academic Press, 1969.

*Primary Examiner*—Theodore Morris
*Attorney, Agent, or Firm*—Hoffmann & Baron

[57]  ABSTRACT

A thermal control coating composition comprising a binder made of a condensation polymerization product of Si—(OR)$_4$ added with titanium oxide acting as a white pigment, common mica particles for improving resistance to thermal cycling and cerium oxide particles for improving the resistance to UV irradiation. The thermal control coating composition has an initial solar absorptance ($\alpha_s$) of not more than 0.3 and an initial thermal emittance ($\epsilon$) of not less than 0.8. The coating composition exhibits excellent properties when subjected to an ageing test corresponding to the use thereof on a standstill orbit for 10 years. The weight of the paint may be reduced by the use of the coating composition of the invention such that an antenna (having a diameter of 3.5 m) of a large capacity communications satellite is coated with 3 kg of the coating composition of the invention to form a durable coating comparable to a coating formed by using 6 kg of a conventional thermal control paint.

7 Claims, 2 Drawing Sheets

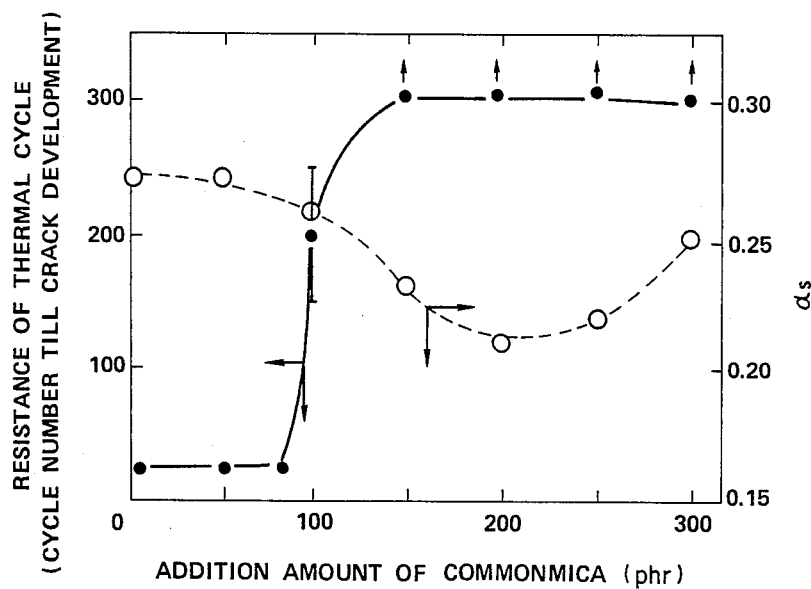
FIG. 1
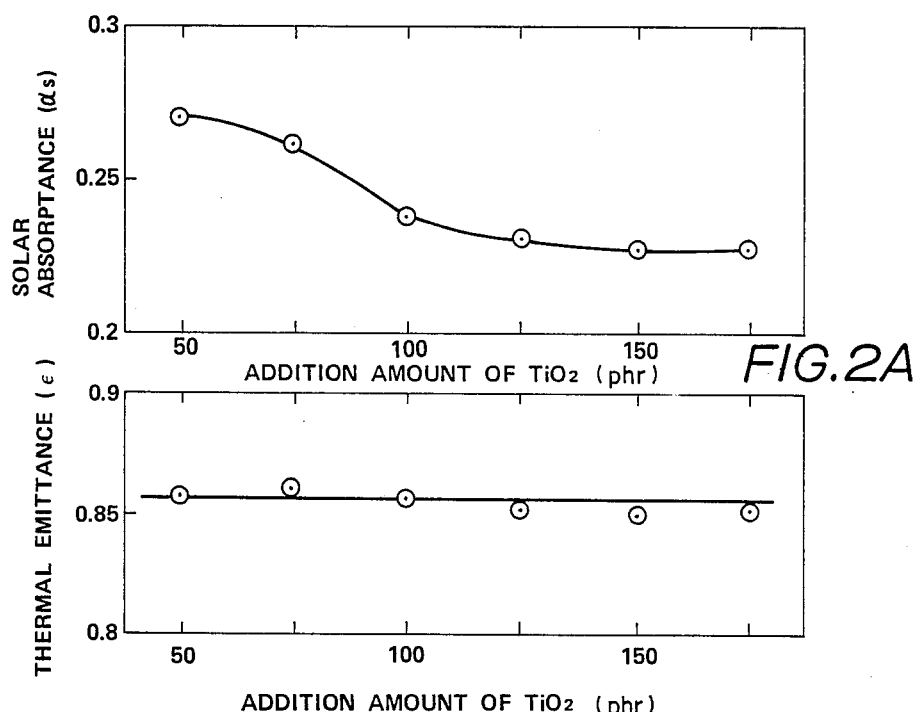
FIG. 2A
FIG. 2B

THERMAL CONTROL COATING COMPOSITION

BACKGROUND OF THE INVENTION

1. Field of Art

The present invention relates to a thermal control coating composition which is coated on the surface of an antenna or tower used in an artificial satellite or space station to control the incomings and outgoings of heat thereby to maintain the temperature of such a member (antenna or tower) within a range of operation temperature.

2. Prior Art Statement

Instruments used in an artificial satellite or like system are generally exposed to severe environment, and hence they must withstand severe environmental conditions to have high reliability, and yet they must be light in weight. For example, an antenna of an artificial satellite is subjected to severe temperature difference, since it is exposed directly to the solar lights at some time and it is cooled to an extremely low temperature when it is held in the shade. In order to ensure proper operation of the antenna, the temperature of the antenna must be maintained below about 100° C. Since the temperature of the antenna is determined by the balance between the thermal energy of the absorbed solar light and the emitted thermal energy due to the radiation from the antenna, it becomes necessary to increase the radiation heat emitted from the antenna when the temperature thereof is raised or to descrease absorption of solar energy by the antenna.

In order to maintain the temperature of an antenna of an artificial satellite below 100° C., a thermal control coating has hitherto been used to decrease the absorption of solar energy incident to the antenna and to emit the thermal energy to the aerospace. The properties of such a thermal control coating are determined by the solar absorptance ($\alpha_s$) showing the absorption factor for absorbing the solar energy and the thermal emittance ($\epsilon$) showing the radiation factor for emitting thermal energy. In order to maintain the temperature of an antenna within a pre-set range, $\alpha_s$ should be low and $\epsilon$ should be high.

An antenna of an artificial satellite is also exposed to an electron ray, gamma rays and ultraviolet rays, and the temperature thereof becomes so low as approximately to −(minus) 180° C. when it is kept in the shade. Accordingly, the coating composition should not be deteriorated by radioactive or ultraviolet rays to have an increased solar absorptance, and cracking, peeling or any other disorders should not be caused in the coating within a temperature range of from −180° C. to 100° C. So it is also necessary that changes in $\alpha_s$ and $\epsilon$ be small.

H. A. Parazian has reported the solar absorption changes of the conventional thermal control coatings in his article, AIAA-84-0059, "Solar Absorption Changes of Thermal Control Coatings During Flight" in AIAA 22nd Aerospace Sciences Meeting, held by American Institute of Aeronautics and Astronautics on Jan. 9 to 12, 1984 at Reno, Nevada. In this report, he investigated the changes in solar absorptance ($\alpha_s$) of thermal control coatings coated on a satellite which had flied for 5 years. His report discloses, for example, a white paint composed of a binder made of a silicone-alkyd resin added with titanium oxide. However, since this paint is applied approximately 100 μm thick, a light weight coating of not more than 150 g/m² cannot be formed by using the same. A further disadvantage is that the coating is easily deteriorated by UV irradiation to have an increased $\alpha_s$, and for this reason it would pose problems when applied on a satellite of long life time. There is a demand for a white paint which forms a thin coating excellent in durability in the aerospace environment, as a large satellite of long life time is required in recent years.

OBJECTS AND SUMMARY OF THE INVENTION

A primary object of this invention is to provide a novel thermal control coating composition which is applied on a variety of instruments used in severe conditions to improve the thermal properties thereof.

Another object of this invention is to provide a thermal control coating composition which can form a thin coating having an improved resistance to UV irradiation, particularly improved in resistance to cracking even when it is exposed to repeated thermal shock cycles, and which is not deteriorated in its thermal control property for a long time.

A more specific object of this invention is to provide a thermal control coating composition having an initial solar absorptance ($\alpha_s$) of not more than 0.3 and an initial thermal emittance ($\epsilon$) of not less than 0.8.

With the aforementioned objects in view, the thermal control coating composition provided by this invention comprises a binder made of a high molecular weight cohdensation polymerization product of a compound selected from the group consisting of silicon compounds and oligomers thereof, the silicon compounds being represented by the following general formula (1) of:

wherein R may be the same or different groups and each stands for an aliphatic hydrocarbon group having 1 to 8 carbon atoms or a phenyl group; 100 to 300 parts by weight, based on 100 parts by weight of said binder, of common mica particle having an average particle size of not more than 40 μm; 50 to 200 parts by weight, based on 100 parts by weight of said binder, of titanium oxide particle having an average particle size of not more than 1 μm; and 50 to 200 parts by weight, based on 100 parts by weight of said binder, of cerium oxide particle having an average particle size of not more than 40 μm.

BRIEF DESCRIPTION OF THE DRAWINGS

FIG. 1 is a graph showing the changes of $\alpha_s$ and resistance to repeated thermal shock cycle in terms of the change in added quantity, by weight, of the commonmica contained in a thermal control coating composition of this invention;

FIGS. 2A and 2B are graphs showing, respectively, the changes in $\alpha_s$ and $\epsilon$ in terms of the change in added quantity, by weight, of the titanium oxide contained in a thermal control coating composition of this invention;

DESCRIPTION OF PREFERRED EMBODIMENTS

Figure 3:
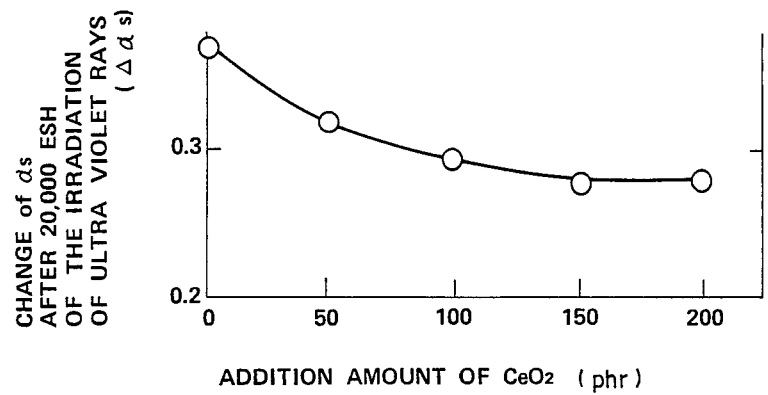
FIG. 3 is a graph showing the change in $\alpha_s$ ($\Delta\alpha_s$) in terms of change in added quantity, by weight, of cerium oxide contained in a thermal control coating composition of this invention when it is exposed to 20,000 ESH (Equivalent Sun Hours) UV irradiation.

The thermal control coating composition, according to this invention, comprises a binder made of a high molecular weight condensation product of inorganic silicon compound, the polymer chain of the condensation product being solely composed of Si—O bonds, and is added with titanium oxide serving as a white pigment, commonmica for improving the resistance to repeated thermal shock cycles, and cerium oxide for improving the resistance to UV irradiation. According to another important feature of this invention, the average particle sizes and added quantities of titanium oxide, commonmica and cerium oxide are selected within optimum ranges to prepare a coating composition which forms a tnin coating film excellent in thermal control property.

The groups R in each of the compounds represented by the general formula of Si—(OR)$_4$ may be the same or different. The group R may be an alkyl group having 1 to 8 carbon atoms or a phenyl group. Specific examples of the compound represented by Si(OR)$_4$, which may be used as the starting material for the binder in the coating composition of this ihvention, are tetramethoxy silane, tetraethoxy silane, methyltriethoxy silane and tetraphenoxy silane. The condensation product of Si-(OR)$_4$ may be prepared by the following process. A compound represented by Si(OR)$_4$ or an oligomer thereof having a condensation polymerization degree of not more than 10 is added in an aqueous solvent, in the presence or absence of an acid catalyst, followed by stirring at 100° C. for 30 minutes to 10 hours. Then, the pH value of the reaction system is adjusted to pH 7 or higher by adding with sodium hydroxide or triethylamine to proceed the condensation reaction. After the completion of condensation reaction, water is removed by distillation or azeotropic distillation.

The thus prepared high molecular weight condensation polymerization product has a three-dimensional cross-linking structure, and should have a condensation polymerization degree of not less than 20 and a molecular weight of not less than about 3000. The condensation polymerization product can be used as an excellent binder in a paint composition. For instance, when it is applied to form a clear coating, a coating film having a film thickness of about 10 microns is formed.

During the step of preparing a high molecular weight cohdensation product used as the binder in the coating composition of this invention from a compound represented by Si(OR)$_4$ or àn oligomer thereof, water or an alcohol is formed as the by-product. It is preferred to select the group R in Si(OR)$_4$ such that the by-product formed by the condensation polymerization has a high vapor pressure at the condensation reaction temperature.

The titanium oxide particle used as a white pigment in the coating composition of this invention should have an average particle size of not more than 1 $\mu$m, preferably from 0.1 to 0.4 $\mu$m. An amount of from 50 to 200 parts by weight, preferably 100 to 150 parts by weight, of the titanium oxide particle is added to 100 parts by weight of the binder. The added quantity of titanium oxide particle should be controlled within the defined range (50 to 200 parts by weight based on 100 parts by weight of the binder) to satisfy the required initial solar absorptance ($\alpha_s$) of not more than 0.3 and to satisfy the required initial thermal emittance ($\epsilon$) of not less than 0.8.

The "common mica" particle used in the coating composition of this invention should have an average particle size of not more than 40 $\mu$m, preferably not more than 15 $\mu$m. An amount of 100 to 300 parts by weight, preferably 150 to 250 parts by weight, of the common mica particle is added to 100 parts by weight of the binder. A coating composition having the lowest solar absorptance ($\alpha_s$) may be produced when 150 to 250 parts by weight of common mica is added to 100 parts by weight of the binder. If the added quantity of common mica is less than the lower limit, improvement in resistance to repeated thermal shock cycles becomes unsatisfactory. Although a coating composition containing titanium oxide and common mica in excess of the defined ranges satisfies the required initial values of $\alpha_s$ and $\epsilon$, the coatability of the composition becomes unsatisfactory and the mechanical strength of the formed coating film is lowered if the added quantities of titanium oxide and/or common mica exceed the defined ranges. It is important to control the added quantities and the particle sizes of the titanium oxide and common mica particles within the defined ranges so that a paint having satisfactory properties is prepared with an advantage that the object of performing thermal control is attained by the provision of a posssibly thin coating film.

The cerium oxide particle used in the coating composition of this invention should have an average particle size of not more than 40 $\mu$m, preferably not more than 15 $\mu$m. An amount of from 50 to 200 parts by weight, preferably 75 to 150 parts by weight of the cerium oxide particle is added to 100 parts by weight of the binder. By controlling the added quantity of the cerium oxide particle within the range of from 50 to 200 parts by weight, based on 100 parts by weight of the binder, the coating composition has the required intitial solar absorptance ($\alpha_s$) of not more than 0.3 and the required initial thermal emittance ($\epsilon$) of not less than 0.8, and the increase of $\alpha_s$ can be suppressed to a slight increment even after the coating is exposed to ultaraviolet rays for 3000 ESH (Equivalent Sun Hours; i.e. the time (in hour) calculated to exposure dose by solar lights in the aerospace environment).

Predetermined quantities of titanium oxide, common mica and cerium oxide are added to the binder and then added with a solvent, such as a thinner or toluene, to prepare a coating composition of the present invention which is stirred by a high speed agitator to form a uniform suspension. The thus prepared suspension is applied on an antenna or a like member and then hardened.

According to this invention, a high molecular weight condensation product of inorganic silicon compound having excellent resistance to radioactive rays is used as a binder which is added with selected quantities of titanium oxide, common mica and cerium oxide particles having predetermined particle sizes to obtain a thermal control coating composition having excellent properties. A coating formed from the thus prepared coating composition of this invention and having a thickness of less than a half of the conventional coating film is durable for a long life time even when it is exposed to radioactive or ultraviolet rays. The coating formed from the thermal control coating composition of this invention has a low solar absorptance ($\alpha_s$) and a high thermal emittance ($\epsilon$). Accordingly, when the coating composition according to this invention is applied on an antenna or tower of a space station or artificial satellite, it exhibits satisfactory performance characteristics.

EXAMPLES OF THE INVENTION

The thermal control coating composition, according to this invention, will now be described in detail with reference to specific examples thereof. However, it is noted here that the present invention should not be limited only to the following examples.

EXAMPLE 1

Into a reaction vessel added were 62 g of tetraethoxy silane, 125 g of methyltriethoxysilane and 187 g of ethyl alcohol. The content in the reaction vessel was heated to 80° C. under agitation. 30 g of a 0.2 N hydrochloric acid was added to the reaction mixture, and the reaction mixture was allowed to react at 80° C. for 10 hours. The reaction mixture was then added with 30 g of triethylamine to adjust the pH value thereof to higher than 7, and then maintained at 80° C. for 2 hours to proceed condensation reaction. Thereafter, 100 g of benzene was added to the reaction mixture which was heated to remove benzene and ethyl alcohol until the content of non-volatile matter reached 40 wt%. The thus obtained reaction product (hereinafter referred to as "reaction product A") was a clear viscous liquid having a viscosity of 5.8 centipoises at 20° C. No change was found after the "reaction product A" was stored at 30° C. for two months to reveal that the "reaction product A" had excellent storage stability.

An amount of 100 parts by weight of the "reaction product A" was added with rutile titanium oxide particles having an average particle size of 0.3 μm (Particle Size Distribution Range: 0.05 to 0.5 μm) and common mica particles having an average particle size of 4 μm (Particle Size Distribution Range: 0.05 to 12 μm), the total quantity of the added titanium oxide particle and the common mica particles being 200 parts by weight while changing the mixing ratio of the rutile titanium oxide particles and the common mica particles as set forth in Table 1. Each of the thus prepared four thermal control coating compositions was diluted with a thinner and then coated on a carbon fiber reinforced plastics board (CFRP board) used as a skin material for an antenna of artificial satellite to form a coating having a thickness of 30 μm. The CFRP board had a thickness of 1 mmm, a solar absorptance ($\alpha_s$) of 0.92 and a thermal emittance ($\epsilon$) of 0.79. Each of the coatings was set at the room temperature for 30 minutes, and then heated to 180° C. for 20 minutes to cure the same. The initial values of $\alpha_s$ and $\epsilon$ are set forth in Table 1. Using a Cockcroft-Walton type electron beam irradiation system, each of the coatings was exposed to electron beam irradiation of 300 keV, $10^{16}$ e/cm$^2$ (Fluence $6.25 \times 10^{11}$ e/cm$^2$ sec, Temperature: 15° C., Degree of Vacuum: $5 \times 10^{-5}$ Torr) which corresponded to the exposure dose irradiated for 10 years in the aerospace environment (on a standstill orbit). The solar absorptance ($\alpha_s$) and the thermal emittance ($\epsilon$) after exposure to the electron beam were measured. The results are shown in Table 1.

TABLE 1

| No. | TiO$_2$ (phr) | Common mica (phr) | Initial Value $\alpha_s$ | Initial Value $\epsilon$ | After Exposure to 300 keV, $10^{16}$ e/cm$^2$ $\alpha_s$ | After Exposure to 300 keV, $10^{16}$ e/cm$^2$ $\epsilon$ |
|---|---|---|---|---|---|---|
| 1 | 200 | 0 | 0.36 | 0.89 | 0.31 | 0.82 |
| 2 | 100 | 100 | 0.24 | 0.86 | 0.25 | 0.86 |
| 3 | 50 | 150 | 0.25 | 0.87 | 0.26 | 0.87 |
| 4 | 0 | 200 | 0.32 | 0.88 | 0.33 | 0.88 |

The increases in the solar absorptance of the thermal control coating compositions of this example after they were exposed to an electron beam of $10^{16}$ e/cm$^2$ were so small as only 0.01. Meantime, the solar absorptance ($\alpha_s$) was measured by a Beckman UV 5240 Device and the thermal emittance ($\epsilon$) was measured by Gier Dunkel Reflectometer Model DB 100.

It was revealed from the results set forth in Table 1 that the thermal control coating composition of this invention was excellent in resistance to electron beam irradiation.

EXAMPLE 2

Seven thermal control coating compositions were prepared by adding 100 parts by weight of rutile titanium oxide particles having an average particle size of 0.3 μm and 50 to 300 parts by weight of common mica particles having an average particle size of 4 μm to 100 parts by weight of the "reaction product A" prepared in Example 1.

Each of the seven coating compositions was coated on a CFRP board to form a 30 μm thick coating which was cured, similarly as in Example 1.

Using a Ransco 934 D thermal cycling test device, each of the cured coatings was subjected to thermal cycling test of −180° C. and +100° C. for 300 cycles to confirm the resistance to repeated thermal shock cycles. The temperature range in the thermal cycling test was corresponding to that encountered in the aerospace environment (on a standstill orbit). No cracking were observed in the coatings formed by the coating compositions containing not less than 150 parts by weight of common mica, after they were subjected to 300 thermal shock cycles. Crackings were found in the coatings formed by the coating compositions containing no common mica and containing 50, 75 and 100 parts by weight of common mica before the thermal shock cycles reached 200. The initial solar absorptance ($\alpha_s$) and the cycle number at which crackings were found are shown in FIG. 1 in terms of the change in added quantity of common mica. The values of initial solar absorptance ($\alpha_s$) were not more than 0.27 as shown in FIG. 1 and the values of initial thermal emittance ($\epsilon$) were not less than 0.85 although not shown in FIG. 1. It was found preferable that the optimum quantity of added common mica was 200 parts by weight in order to obtain the lowest initial solar absorptance ($\alpha_s$).

EXAMPLE 3

Six thermal control coating compositions were prepared by adding 200 parts by weight of common mica particle having an average particle size of 4 μm and 50 to 200 parts by weight of rutile titanium oxide particles having an average particle size of 0.3 μm to 100 parts by weight of the "reaction product A" prepared in Example 1. Generally following to the procedures as described in Example 1, each of the six coating compositions was coated on a CFRP board to form a 30 μm thick coating which was then cured. The values of solar absorptance ($\alpha_s$) and the thermal emittance ($\epsilon$) of the six coatings are shown in FIGS. 2A and 2B. As shown, all of the six coatings had solar absorptance ($\alpha_s$) of not more than 0.27 and thermal emittance ($\epsilon$) of not less than 0.85. The solar absorptance is lowered as the quantity of added titanium oxide is increased, but the change of $\alpha_s$ is not significant even when the added quantity of titanium oxide is increased beyond 100 parts by weight.

COMPARATIVE EXAMPLE

A thermal control silicone-alkyd resin paint APA-2427 (produced by Whittaker Corp.) was coated on the same CFRP boards as used in Example 1 to form coatings respectively having thicknesses of 40, 80 and 130 µm. The coatings were then cured at the room temperature for 48 hours. The the values of solar absorptance ($\alpha_s$) and the thermal emittance ($\epsilon$) of the coatings are shown in Table 2.

TABLE 2

| Paint | Thickness of the Coating (µm) | Initial Value | | After Exposure to 300 keV, $10^{16}$ e/cm$^2$ | |
|---|---|---|---|---|---|
| | | $\alpha s$ | $\epsilon$ | $\alpha s$ | $\epsilon$ |
| APA-2427 | 40 | 0.24 | 0.87 | — | — |
| | 80 | 0.19 | 0.86 | 0.20 | 0.86 |
| | 130 | 0.18 | 0.87 | — | — |

EXAMPLE 4

An amount of 100 parts by weight of rutile titanium oxide particles having an average particle size of 0.3 µm (Particle Size Distribution Range: 0.05 to 0.5 µm), 200 parts by weight of common mica particles having an average particle size of 4µm (Particle Size Distribution Range: 0.05 to 12 µm) and 50 to 200 parts by weight of cerium oxide particles having an average particle size of 2 µm (Particle Size Distribution Range: 0.05 to 15 µm) were added to 100 parts by weight of the "reaction product A" prepared in Example 1, whereby four thermal control coating compositions were prepared. Similarly as in Example 1, each of the four coating compositions was coated on a CFRP board to form a 30 micron thick coating and then set at the room temperature for 30 minutes. The coating was cured by heating the same at 180° C. for 20 minutes.

The solar absorptance ($\alpha_s$) and the thermal emittance ($\epsilon$) of the thus formed thermal control coatings were measured, generally following to the procedures as described in Example 1. The initial values and the values found after exposing to an electron beam irradiation of 300 keV, $10^{16}$ e/cm$^2$ are shown in Table 3.

TABLE 3

| No. | Cerium Oxide (phr) | Initial Value | | After Exposure to 300 keV, $10^{16}$ e/cm$^2$ | |
|---|---|---|---|---|---|
| | | $\alpha s$ | $\epsilon$ | $\alpha s$ | $\epsilon$ |
| 1 | 200 | 0.22 | 0.86 | 0.23 | 0.82 |
| 2 | 150 | 0.23 | 0.86 | 0.24 | 0.86 |
| 3 | 100 | 0.23 | 0.87 | 0.24 | 0.87 |
| 4 | 50 | 0.22 | 0.86 | 0.23 | 0.86 |

As will be seen from the results set forth in Table 3, the increases in solar absorptance of the thermal control coating compositions of this invention after they were exposed to an electron beam of $10^{16}$ e/cm$^2$ were so small as only 0.01. The coatings were also subjected to thermal cycling test (from $-180°$ C. to $+100°$ C.) conducted similarly as in Example 2. No cracking or other disorder were found in all of the coatings after they were subjected to thermal cycling test for 300 times.

FIG. 3 shows the changes of $\alpha_s(\Delta\alpha_s)$ due to exposure to 20,000 ESH UV irradiation, in terms of the changes in added quantity of cerium oxide. The UV irradiation was effected at a temperature of 40° C. and at a degree of vacuum of $5\times10^{-5}$ Torr while using a mercury-xenon short arc lamp. The exposure time to UV irradiation was indicated by ESH (Equivalent Sun Hours) showing the corresponding exposure dose by solar lights in the aerospace environment. It will be understood from the results shown in FIG. 3 that the changes in solar absorptance ($\alpha_s$) may be lowered as the quantity of the added cerium oxide is increased, and that the change in solar absorptance ($\alpha_s$) are negligible when the quantity of the added cerium oxide is increased beyond the range of more than 150 parts by weight.

Figure 4A:
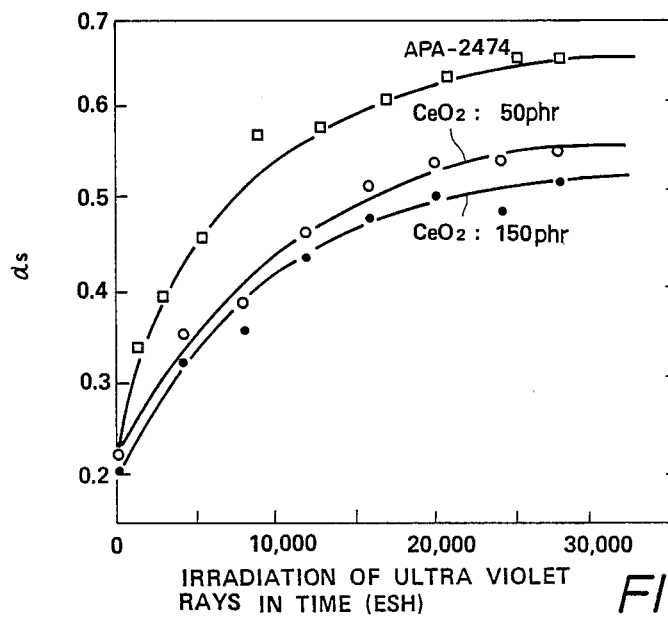
FIGS. 4A and 4B are graphs showing, respectively, the changes in $\alpha_s$ and $\epsilon$ of a thermal control coating composition of this invention and those of a comparative example in terms of the time of UV irradiation (ESH).
Figure 4B:
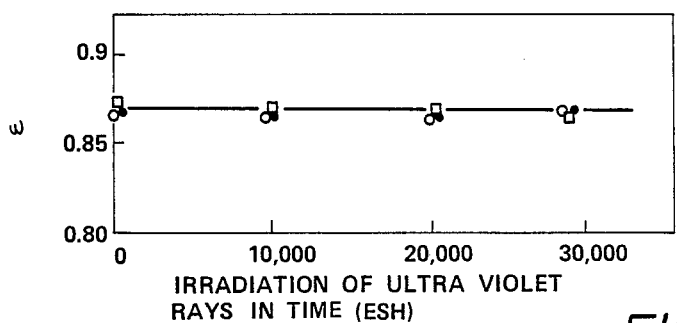

FIGS. 4A and 4B show the changes of solar absorptances ($\alpha_s$) and thermal emittances ($\epsilon$) of the coating Nos. 2 and 4, containing respectively 50 parts by weight and 150 parts by weight of cerium oxide, and also show the changes of solar absorptance ($\alpha_s$) and thermal emittance ($\epsilon$) of a comparative example containing no cerium oxide, in terms of the exposure time to UV irradiation. The curve plotting the marks shows the No. 4 coating composition containing 50 parts by weight of cerium oxide, the curve plotting the marks ● shows the No. 2 coating composition containing 150 parts by weight of cerium oxide, and the curve plotting the marks ☐ shows a comparative example formed by the use of the conventional paint APA-2427.

After being exposed to 28,000 ESH UV irradiation corresponding to the irradiation dose for 10 years in the aerospace environment, the solar absorptance ($\alpha_s$) of the thermal control coating formed from the coating composition of this invention (added with 50 parts by weight of cerium oxide) was changed to 0.56 (Initial Value: 0.23) and that of the coating formed from the coating composition of this invention (added wtith 150 parts by weight of cerium oxide) was changed to 0.53 (Initial Value: 0.23). The increases of $\alpha_s$ due to the UV irradiation were 0.3 to 0.33. In contrast thereto, the solar absorptance $\alpha_s$ of the coating formed from the conventional paint containing no cerium oxide was increased from the initial value of 0.19 to 0.64 due to the same UV irradiation dose, the increase of $\alpha_s$ being 0.45. It is thus clearly seen that the resistance to UV irradiation of the thermal control coating provided by this invention is improved by the addition of cerium oxide. It has been considered that the changes in thermal emittance ($\epsilon$) of the coatings formed from both of the coating compositions of the present invention and the conventional paint are negligible.

EXAMPLE 5

100 parts by weight of rutile titanium oxide particles having an average particle size of 0.3 µm (Particle Size Distribution Range: 0.05 to 0.5 µm), 200 parts by weight of common mica particles having an average particle size of 4 µm (Particle Size Distribution Range: 0.05 to 12 µm) and 150 parts by weight of cerium oxide particles having an average particle size of 2 µm (Particle Size Distribution Range: 0.05 to 15 µm) were added to 100 parts by weight of the "reaction product A" prepared in Example 1 to prepare a thermal control coating composition. The coating composition was coated on a CFRP board to form a 30µm thick coating, similarly as in Example 1. The coating was cured by allowing the same to stand at the room temperature for one week. The initial solar absorptanace ($\alpha_s$) was 0.23 and the initial thermal emittance ($\epsilon$) was 0.87. The increase of $\alpha_s$ after the coating was exposed to an electron beam irradiation of 300 keV, $10^{16}$ e/cm$^2$ was so small as only 0.01. The result of thermal cycling test conducted similarly as in Example 2 between the temperature range of from $-180°$ C. to $+100°$ C. was that no cracking or other disorder was found. The resistance to UV irradiation of the thermal control coating was tested by exposing the same to 28,000 ESH UV irradiation, similarly as described in Example 4. The increase of $\alpha_s$ was 0.32.

The results of this Example shows that the thermal control coating composition of this invention forms a coating having the required properties even when it is cured at the room temperature, the properties of the coating cured at the room temperature being comparable to those of the coating cured at a high temperature.

The properties of the white paint of Example 5 will be set forth in the following Table 4 in which the properties of the conventional white paint are set forth for comparison purpose.

TABLE 4

| | Present Invention | Comparative Example |
|---|---|---|
| | 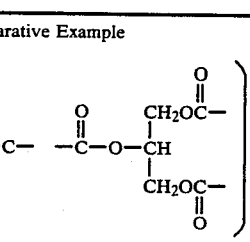 | |
| Binder | Silicone | Silicone-Alkyd Resin |
| Pigment | TiO$_2$ Commonmica CeO$_2$ | TiO$_2$ |
| Weight of Coating (g/m$^2$) | 70 | 150 |
| Initial Value | | |
| $\alpha_s$ | 0.23 | 0.19 |
| $\epsilon$ | 0.88 | 0.87 |
| Resistance to Thermal Cycling ($-180°$ C. to 100° C.) | good | good |
| Resistance to Electron Beam Irradiation $\Delta\alpha_s$ (300 keV, $10^{16}$ e/cm$^2$) | 0.01 | 0.00 |
| Resistance to UV Irradiation $\Delta\alpha_s$ (28,000 ESH) | 0.32 | 0.45 |

When the coating composition of Example 4 is coated on both sides of an antenna (diameter: 3.5 m) in a large capacity communications satellite, the total weight of the coating amounts to about 3 kg, and the estimated solar absorptance $\alpha_s$ (EOL) after the satellite has been held on a standstill orbit for 10 years is 0.23 (Initial Value)+0.32=0.55. In contrast thereto, when a coating is formed by the use of the conventional silicone-alkyd resin base paint on the same antenna, the total weight of the coating becomes about 6 kg, and the estimated solar absorptance $\alpha_s$(EOL) after the satellite has been held on a stanstill orbit for 10 years is 0.19 (initial Value)+0.45=0.64. Accordingly, it should be readily understood that the thermal control coating composition, according to the present invention, enables the provision of a lighther weight artificial satellite and ensures that a satellite on a standstill orbit is operable for a life-time of more than 10 years.

What is claimed is:

1. A thermal control coating composition comprising:
  a binder made of a high molecular weight condensation polymerization product of a compounds and oligomers thereof, the silicon compounds being represented byt the following general formula (1) of:

wherein R may be the same or different groups and each stands for an aliphatic hydrocarbon group having 1 to 8 carbon atoms or a phenyl group; 100 to 300 parts by weight, based on 100 parts by weight of said binder, of common rica particle having an average particle size of not more than 40 $\mu$m;
  50 to 200 parts by weight, based on 100 parts by weight of said binder, of titanium oxide particle having an average particle size of not more than 1 $\mu$m; and
  50 to 200 parts by weight, based on 100 parts by weight of said binder, of cerium oxide particle having an average particle size of not more than 40 $\mu$m.

2. The coating composition according to claim 1, wherein R in said general formula (1) is at least one selected from the group consisting of methyl, ethyl and phenyl.

3. The coating composition according to claim 1, wherein the degree of condensation polymerization of said oligomer is not more than 10.

4. The coating composition according to claim 1, wherein said high molecular weight condensation product is prepared by hydrolyzing at least one compound represented by said general formula (1) or an oligomer thereof in the presence of an acid catalyst, and then polymerizing the hydrolyzed compound or ligomer by condensation while adjusting the pH value of the reaction system to not less than pH 7.

5. The coating composition according to claim 1, wherein said common mica particle has an average particle size of not more than 15 μm, and is added in an amount of 150 to 250 parts by weight.

6. The coating composition according to claim 1, wherein said titanium oxide particle has an average particle size of from 0.1 to 0.5 μm, and is added in an amount of from 100 to 150 parts by weight.

7. The coating composition according to claim 1, wherein said cerium oxide particle has an average particle size of not more than 15 μm, and is added in an amount of from 75 to 150 parts by weight.

* * * * *